(No Model.)
J. D. GRABILL.
TRUCK.
No. 528,939.   Patented Nov. 13, 1894.
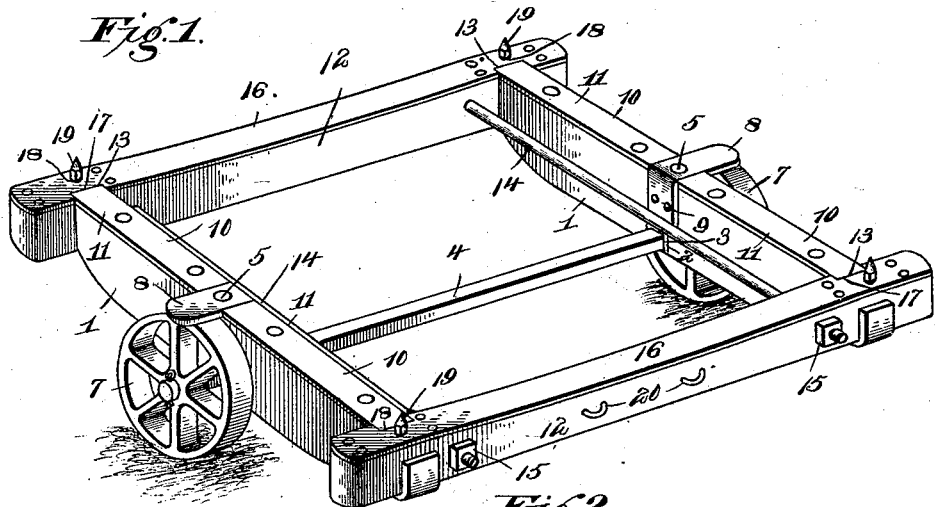
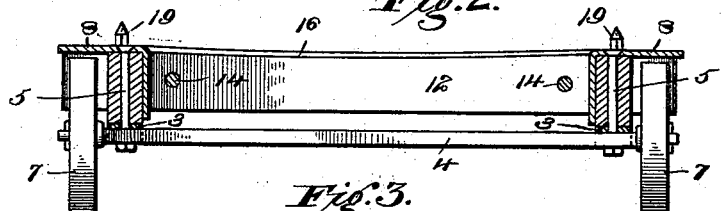
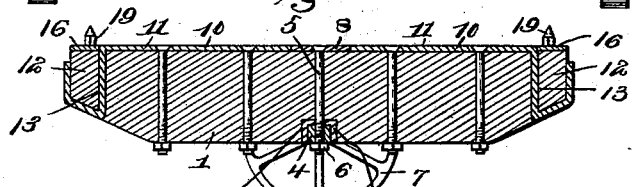
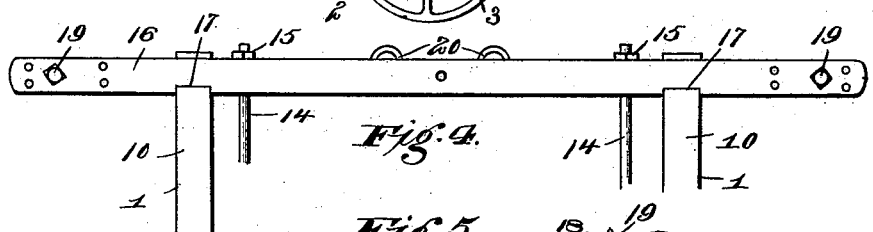
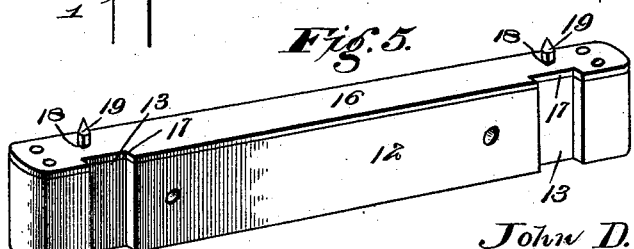
Witnesses
John C. Shaw
F. D. Owens
Inventor
John D. Grabill,
By his Attorneys,
C. A. Snow & Co.
THE NORRIS PETERS CO., PHOTO-LITHO., WASHINGTON, D. C.

UNITED STATES PATENT OFFICE.

JOHN D. GRABILL, OF ROANOKE, VIRGINIA.

TRUCK.

SPECIFICATION forming part of Letters Patent No. 528,939, dated November 13, 1894.

Application filed June 15, 1894. Serial No. 514,680. (No model.)

*To all whom it may concern:*

Be it known that I, JOHN D. GRABILL, a citizen of the United States, residing at Roanoke, in the county of Roanoke and State of Virginia, have invented a new and useful Truck, of which the following is a specification.

This invention relates to an improvement in that class of trucks which are adapted for carrying weighty objects, and for unloading cars, vessels and the like.

The principal object of the invention is to produce a truck which will be capable of adjustment to suit the various sizes of articles carried and to suit the size of the doorways through which the truck may have to pass. This end I attain by providing a truck having side bars or beams rigidly connected to an axle, and therefore incapable of longitudinal movement on the axle. These side bars or beams are provided at their ends with removable end beams, whereby it is possible to remove one set of end beams and replace them by a second set differing in size.

In the accompanying drawings: Figure 1 represents a perspective view, showing my complete truck; Fig. 2, a cross-section taken through the axle thereof; Fig. 3, a longitudinal section taken through one of the side beams; Fig. 4, a plan view of one end of my truck, showing a different size end beam applied thereto; Fig. 5, a detail perspective of one of the end beams.

The reference numeral 1 indicates the two side beams of the truck, which are formed, at their lower sides, with the transversely-extending slots 2. The slots 2 are one for each beam and are arranged at the middle thereof. Located within the slots 2, and covering the sides thereof, are the metallic plates 3, which have for their purpose to form a seat for the axle 4 and to prevent the wearing of the wood which would otherwise result from direct contact with the axle. The axle 4 is held in place by the vertical tie-rods 5, which pass through the beams 1 from their upper to their lower sides, and which are provided with nuts 6 on their lower ends.

7 indicates the wheels of the truck, which are loosely mounted on the respective ends of the axle 4, and which operate as will be understood to support the truck. Rigidly secured to the side beams 1 are the wheel-fenders 8, which are formed of angular plates of iron having a vertical portion secured to the inner side of the respective beams 1 by the threaded bolts 9; while the horizontal portions of the fenders extend over the upper edge of the side beams, and beyond the same to a point above the wheels 7. The tie-rods 5 pass through the horizontal portions of the fenders 8, and in so doing assist in holding the fenders in place.

Rigidly secured to the upper sides of the beams 1, and one for each end of the beams, are the plates 10, which are formed of heavy iron and which have a horizontal portion 11, countersunk in the upper sides of the beams 1 and extending to the respective ends thereof. At the ends of the beams 1 the plates 10 extend downwardly and outwardly, and finally upwardly to a point a slight distance below the plane occupied by the upper edges of the side beams, thereby forming a seat or pocket in which the end beams of the truck are adapted to be arranged.

12 indicates the end beams of the truck, which beams are two in number, and which are formed of heavy wood, as are the side beams 1. The beams 12 are each formed with the vertical and angular grooves 13 therein, which are two for each beam and which are arranged one at each end thereof, so that they will be in position to receive that portion of the plates 10 which extends downwardly from the horizontal portion 11 thereof. Thus it will be seen that the end beams when seated in place are secured so as to be incapable of lateral movement or of longitudinal movement. The lower sides or edges of the beams 12 are inclined or beveled from the inner side upwardly toward the outer side, so that the truck will be permitted to tilt as much as possible, and thereby make it capable of receiving its load with greater ease than otherwise. The plates 10 are also formed at the outwardly-extending portion aforesaid, with an incline conforming with the incline of the beams 12.

14 indicates two horizontal and longitudinally-extending tie-rods, which are passed from one of the end beams 12 to the other, and are provided at each end with the nuts 15, operating on correspondingly-threaded ends of the rod, so that the rods may be removed from either of their ends. The purpose of the rods 14 is to prevent the removal of the end beams 12, and to hold them rigidly in place. It will be understood that the end beams may be, when so desired, removed either by moving them upwardly in unison with each other and causing the two end beams and the tie-rods 14 to be removed as a unit, or by releasing the tie-rods 14 and removing the end beams independently.

The operation of the tie-rods 14 is not to prevent upward movement of the end pieces, but to draw the grooves 13 tightly against the adjacent portions of the plates 10. This operation may indirectly result in a tendency against upward movement, owing to the friction between the two parts, and because of this it will be necessary to release the tie-rods before the end pieces can be withdrawn.

Rigidly secured to the upper sides of the end pieces 12 are the facing-places 16, which are one for each end piece and which are formed with the notches 17 therein to conform with the grooves 13. Formed in the plates 16, and extending into the end pieces or beams, are the threaded openings 18, which are, by preference, four for each beam, though this may be variously increased to suit the will of the manufacturer or the conditions under which the truck is to be used. The openings 18 are adapted for the reception of the spurs 19, which are two for each beam and which are threaded to conform with the threads of the openings 18. The spurs 19 are provided with sharp points at their upper ends, and are formed with a square portion to facilitate the use of a nut-wrench thereon. Thus it will be seen that the spurs are capable of being secured in any one of the openings 18 throughout the length of their respective end beams. The spurs 19 have for their purpose to engage the load of the truck and to hold it from slipping thereon; while, if the nature of the load is such that its engagement with the spurs will injure the load, the spurs 19 may be completely removed.

20 indicates two eyes or staples which are rigidly secured to each of the end pieces or beams 12, and which have for their purpose to permit the connection of suitable detachable tongues to the truck. By means of these tongues the truck may be easily moved and great force applied thereto.

In the use of my invention, the end beams which are best adapted to the size and nature of the load to be carried are secured in their places and the truck loaded with the article to be transported. Should it be desired, however, to use the truck with a larger load, supposing that the smaller end beams had been previously used, the first end beams may be removed and a second set better adapted to the size of the load put in their places. Should the conditions under which my truck is used make it necessary to have the top of the load as low as possible, this may be done by removing the end beams from the truck and replacing them by an ordinary crow-bar, which will lie in the lowest portion of the plates 10, and thereby permit the load to rest upon the axle 4 rather than upon the upper ends of the side and end beams.

It is obvious that my invention may be changed in size and in proportion without departing from the spirit and scope of the invention. For example, it is not essential that the exact form of the end beams be adhered to, since any devices which possess their essential elements would be equivalent, thereof and consequently mere formal variations.

Having described my invention, what I claim is—

1. A truck comprising in its construction two longitudinal side beams, an axle mounted upon said beams, wheels operating with the axle to support the truck, metallic plates secured one to each end of the side beams and extending beyond the said ends, the extended portions of the plates being bent downwardly, outwardly and thence upwardly to form seats or pockets, and end beams removably seated in the bent portions of said plates whereby the end pieces may be removed and substituted by another set of different length, substantially as described.

2. A truck comprising in its construction two longitudinal side beams, an axle fixed to the lower side thereof, carrying-wheels mounted on the axle and adapted to support the truck, the ends of the side beams being formed with seats or pockets thereon, and removable end beams adapted to be seated in said seats or pockets and capable of being removed and replaced by end beams of different length, substantially as described.

3. A truck comprising in its construction two longitudinal side beams, an axle fixed to the side beams, wheels mounted upon the axle and adapted to support the truck, plates secured one to each end of the side beams and extending beyond the ends thereof, the extended portions of said plates being bent downwardly, outwardly and thence upwardly to form a pocket or seat, end beams adapted to be arranged in said pockets or seats and having vertical grooves therein adapted to receive the ends of the side beams, and tie-rods extending longitudinally from one end beam to the other, substantially as described.

4. A truck comprising in its construction two longitudinal side beams provided with suitable end beams, the side beams having formed on their under sides, and oppositely thereon, upwardly-extending recesses, an angular metallic plate secured in each recess, an axle corresponding in shape with the shape of the plate and extending across from one side beam to the other and located in the plates of the recesses in the side beams, a bolt passing through the axle at each side beam and extending vertically through the same, whereby the axle is secured in place, and wheels mounted rotatably upon the axle, substantially as described.

In testimony that I claim the foregoing as my own I have hereto affixed my signature in the presence of two witnesses.

JOHN D. GRABILL.

Witnesses:
W. D. COFER,
RO. M. KENT, Jr.